(12) United States Patent
Chang et al.

(10) Patent No.: US 11,108,697 B2
(45) Date of Patent: Aug. 31, 2021

(54) TECHNOLOGIES FOR CONTROLLING JITTER AT NETWORK PACKET EGRESS

(71) Applicant: Intel Corporation, Santa Clara, CA (US)

(72) Inventors: Chih-Jen Chang, Union City, CA (US); Robert Southworth, Chatsworth, CA (US); Naru Dames Sundar, Los Gatos, CA (US); Yue Yang, Palo Alto, CA (US); Charles Michael Atkin, Houston, TX (US); John Leshchuk, East Hanover, NJ (US)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 15/942,023

(22) Filed: Mar. 30, 2018

(65) Prior Publication Data

US 2019/0044867 A1 Feb. 7, 2019

(51) Int. Cl.
| | |
|---|---|
| *H04L 12/26* | (2006.01) |
| *H04L 12/819* | (2013.01) |
| *H04L 12/813* | (2013.01) |
| *H04L 12/721* | (2013.01) |

(52) U.S. Cl.
CPC ......... *H04L 47/215* (2013.01); *H04L 43/087* (2013.01); *H04L 45/38* (2013.01); *H04L 47/20* (2013.01)

(58) Field of Classification Search
CPC ....... H04L 43/087; H04L 45/38; H04L 47/20; H04L 47/215; H04L 49/205; H04L 49/3027; H04L 49/90
See application file for complete search history.

(56) References Cited

U.S. PATENT DOCUMENTS

| | | | | |
|---|---|---|---|---|
| 8,861,514 | B1 * | 10/2014 | Lin | H04L 47/56 370/376 |
| 9,013,999 | B1 * | 4/2015 | Kondapalli | H04L 47/22 370/235.1 |
| 2018/0150371 | A1 * | 5/2018 | Gintis | G06F 11/1004 |
| 2019/0044859 | A1 * | 2/2019 | Sundar | G06F 3/0605 |

\* cited by examiner

*Primary Examiner* — Mansour Oveissi
(74) *Attorney, Agent, or Firm* — Compass IP Law, PC (57) ABSTRACT

Technologies for controlling jitter at network packet egress at a source computing device include determining a switch time delta as a difference between a present switch time and a previously captured switch time upon receipt of a network packet scheduled for transmission to a target computing device and determining a host scheduler time delta as a difference between a host scheduler timestamp associated with the received network packet and a previously captured host scheduler timestamp. The source computing device is additionally configured to determine an amount of previously captured tokens present in a token bucket, determine whether there are a sufficient number of tokens available in the token bucket to transmit the received packet as a function of the switch time delta, the host scheduler time delta, and the amount of previously captured tokens present in the token bucket, and schedule the received network packet for transmission upon a determination that sufficient tokens in the token bucket.

16 Claims, 5 Drawing Sheets

TECHNOLOGIES FOR CONTROLLING JITTER AT NETWORK PACKET EGRESS

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device, which is then sent to a transmission component (e.g., a network interface controller (NIC) of the computing device) responsible for dispatching the network packet to another computing device using wired and/or wireless communication technologies and protocols over a network.

To determine when to transmit each network packet, the computing device relies on one or more schedulers. Under certain conditions, such as congestion, improper queueing, configuration errors, etc., the delivery of the network packets may not be sent in a steady stream. In other words, the delay between packet transmissions can vary instead of remaining constant. The variation in the delay of the network packets is commonly referred to as jitter, and can have a negative impact at the receiving computing device (e.g., gaps in video/audio playback, imbalanced resource usage, etc.). For example, media playback under conditions in which the magnitude of jitter is so great that packets are received out of range (e.g., of the playout delay buffer) can result in the out-of-range network packets being discarded, further resulting in dropouts appearing in the media playback. Typically, a scheduler of the transmitting computing device controls the jitter at the host-level; however, latency can be introduced between any two network packets in the egress pipeline and the switch after the host-scheduler, which can result in additional jitter in the packet flow.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
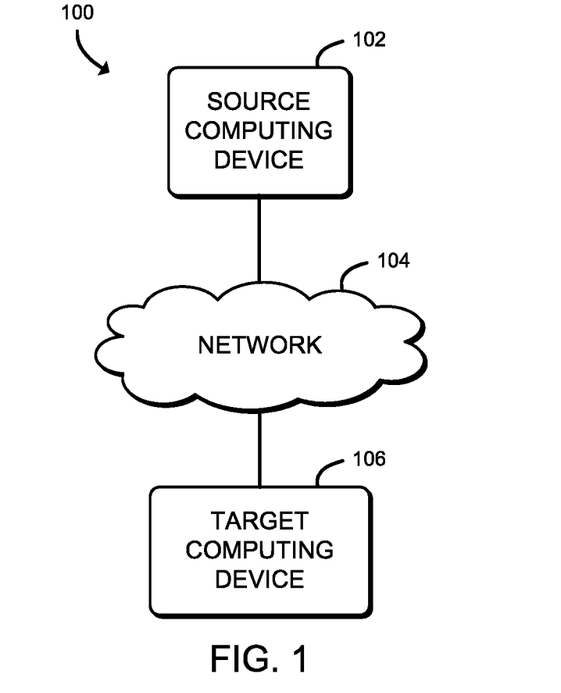
FIG. 1 is a simplified block diagram of at least one embodiment of a system for controlling jitter at network packet egress that includes a source computing device communicatively coupled to a target computing device.

Referring now to FIG. 1, in an illustrative embodiment, a system 100 for controlling jitter at network packet egress includes a source computing device 102 communicatively coupled to a target computing device 106 via a network 104.

In use, the source computing device 102 generates and transmits network packets (e.g., messages, Ethernet frames, etc.) to the target computing device 106, while the target computing device 106 receives and processes the network packets received from the source computing device 102. However, certain conditions can result in negative issues during the forwarding of the network packets through the source computing device 102 and/or during the transmission of the network packets to the target computing device through the various wireless and wired communication mediums. Such negative issues can include latency, jitter, network congestion, timing drift, routing changes, dropped packets, etc.

Various techniques have been developed to address such negative issues, including flow control technologies, network packet scheduling algorithms, etc. For example, present solutions for controlling jitter include using complex scheduling mechanisms to control jitter at the host scheduler level. However, latency can also be introduced between any two packets in the egress pipeline and the switch of the source computing device 102 after the host scheduler has scheduling the network packet for transmission, which can result in additional jitter in the packet flow. Accordingly, the source computing device 102 is configured to compare timestamps associated with each network packet to be scheduled for transmission and timestamps associated with a previously transmitted network packet. More particularly, as described in further detail below, the source computing device 102 is configured to validate that a local time stamp difference is greater than or equal to a difference between a host scheduler timestamp of the present network packet to be scheduled and a host scheduler timestamp of the most recently transmitted network packet from the same traffic class queue.

While illustratively shown as a single source computing device 102 and a single target computing device 106, it should be appreciated that the system may include multiple source computing devices 102 and/or multiple target computing devices 106. The source computing device 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., standalone, rack-mounted, blade, etc.), a sled (e.g., compute, storage, accelerator, etc.), a gateway, a network appliance (e.g., physical or virtual), a web appliance, a distributed computing system, a processor-based system, and/or a multiprocessor system.

Figure 2:
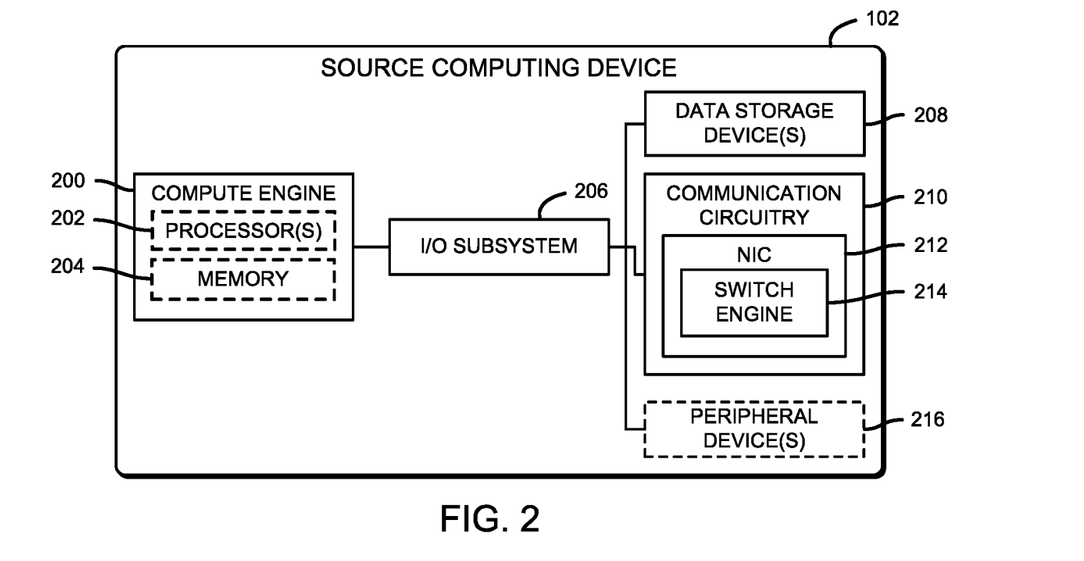
FIG. 2 is a simplified block diagram of at least one embodiment of the source computing device of the system of FIG. 1.

Referring now to FIG. 2, an illustrative source computing device 102 includes a compute engine 200, an I/O subsystem 206, one or more data storage devices 208, communication circuitry 210, and, in some embodiments, one or more peripheral devices 216. It should be appreciated that the source computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 200 may be embodied as any type of device or collection of devices capable of performing the various compute functions as described herein. In some embodiments, the compute engine 200 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 200 may include, or may be embodied as, one or more processors 202 (i.e., one or more central processing units (CPUs)) and memory 204.

The processor(s) 202 may be embodied as any type of processor capable of performing the functions described herein. For example, the processor(s) 202 may be embodied as one or more single-core processors, one or more multi-core processors, a digital signal processor, a microcontroller, or other processor or processing/controlling circuit(s). In some embodiments, the processor(s) 202 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 204 may be embodied as any type of volatile (e.g., dynamic random access memory (DRAM), etc.) or non-volatile memory or data storage capable of performing the functions described herein. It should be appreciated that the memory 204 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 200 is communicatively coupled to other components of the source computing device 102 via the I/O subsystem 206, which may be embodied as circuitry and/or components to facilitate input/output operations with the processor 202, the memory 204, and other components of the source computing device 102. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the processor 202, the memory 204, and other components of the source computing device 102, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the source computing device 102 and other computing devices, as well as any network communication enabling devices, such as an access point, network switch/router, etc., to allow communication over the network 104. Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 210 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the source computing device 102, etc.), performing computational functions, etc.

In some embodiments, performance of one or more of the functions of communication circuitry 210 as described herein may be performed by specialized circuitry, hardware, or combination thereof of the communication circuitry 210, which may be embodied as a system-on-a-chip (SoC) or otherwise form a portion of a SoC of the source computing device 102 (e.g., incorporated on a single integrated circuit chip along with a processor 202, the memory 204, and/or other components of the source computing device 102). Alternatively, in some embodiments, the specialized circuitry, hardware, or combination thereof may be embodied as one or more discrete processing units of the source computing device 102, each of which may be capable of performing one or more of the functions described herein.

The illustrative communication circuitry 210 includes a network interface controller (NIC) 212, also commonly referred to as a host fabric interface (HFI) in some embodiments (e.g., high-performance computing (HPC) environments). The NIC 212 may be embodied as one or more add-in-boards, daughtercards, network interface cards, controller chips, chipsets, or other devices that may be used by the source computing device 102. In some embodiments, the NIC 212 may be embodied as part of a system-on-a-chip (SoC) that includes one or more processors, or included on a multichip package that also contains one or more processors. In some embodiments, the NIC 212 may include a local processor (not shown) and/or a local memory (not shown) that are both local to the NIC 212. In such embodiments, the local processor of the NIC 212 may be capable of performing one or more of the functions of a processor 202 described herein.

Additionally or alternatively, in such embodiments, the local memory of the NIC 212 may be integrated into one or more components of the source computing device 102 at the board level, socket level, chip level, and/or other levels. For example, in some embodiments, the NIC 212 may be integrated with the processor 202, embodied as an expansion card coupled to the I/O subsystem 204 over an expansion bus (e.g., PCI Express), part of a SoC that includes one or more processors, or included on a multichip package that also contains one or more processors. Additionally or alternatively, in some embodiments, functionality of the NIC 212 may be integrated into one or more components of the source computing device 102 at the board level, socket level, chip level, and/or other levels. The illustrative NIC 212 includes a switch engine 214. The switch engine 214 may be any type of virtual and/or physical device capable of performing network packet switching operations as described herein.

The one or more peripheral devices 216 may include any type of device that is usable to input information into the source computing device 102. The peripheral devices 216 may be embodied as any auxiliary device usable to input information into the source computing device 102, such as a keyboard, a mouse, a microphone, a barcode reader, an image scanner, etc., or output information from the source computing device 102, such as a display, a speaker, graphics circuitry, a printer, a projector, etc. It should be appreciated that, in some embodiments, one or more of the peripheral devices 216 may function as both an input device and an output device (e.g., a touchscreen display, a digitizer on top of a display screen, etc.). It should be further appreciated that the types of peripheral devices 216 connected to the source computing device 102 may depend on, for example, the type and/or intended use of the source computing device 102. Additionally or alternatively, in some embodiments, the peripheral devices 216 may include one or more ports, such as a USB port, for example, for connecting external peripheral devices to the source computing device 102.

Referring back to FIG. 1, similar to the source computing device 102, the target computing device 106 may be embodied as any type of computation or computer device capable of performing the functions described herein, including, without limitation, a server (e.g., stand-alone, rack-mounted, blade, sled, etc.), switch (e.g., a disaggregated switch, a rack-mounted switch, a standalone switch, a fully managed switch, a partially managed switch, a full-duplex switch, and/or a half-duplex communication mode enabled switch), a router, a gateway, a network appliance (e.g., physical or virtual), a web appliance, a distributed computing system, a processor-based system, and/or a multiprocessor system.

It should be appreciated that the target computing device 106 includes similar and/or like components to those of the illustrative source computing device 102 of FIG. 2, such as a compute engine (e.g., with one or more processors and memory), an I/O subsystem, one or more data storage devices, communication circuitry, etc. As such, figures and descriptions of the similar/like components are not repeated herein for clarity of the description with the understanding that the description of the corresponding components provided above in regard to the source computing device 102 of FIG. 2 applies equally to the corresponding components of the target computing device 106. Of course, it should be appreciated that the target computing device 106 may include additional and/or alternative components, depending on the embodiment.

The network 104 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, (high-speed) interconnects, etc.), as needed to facilitate communication between the source computing device 102 and the target computing device 106, which are not shown to preserve clarity of the description.

Figure 3:
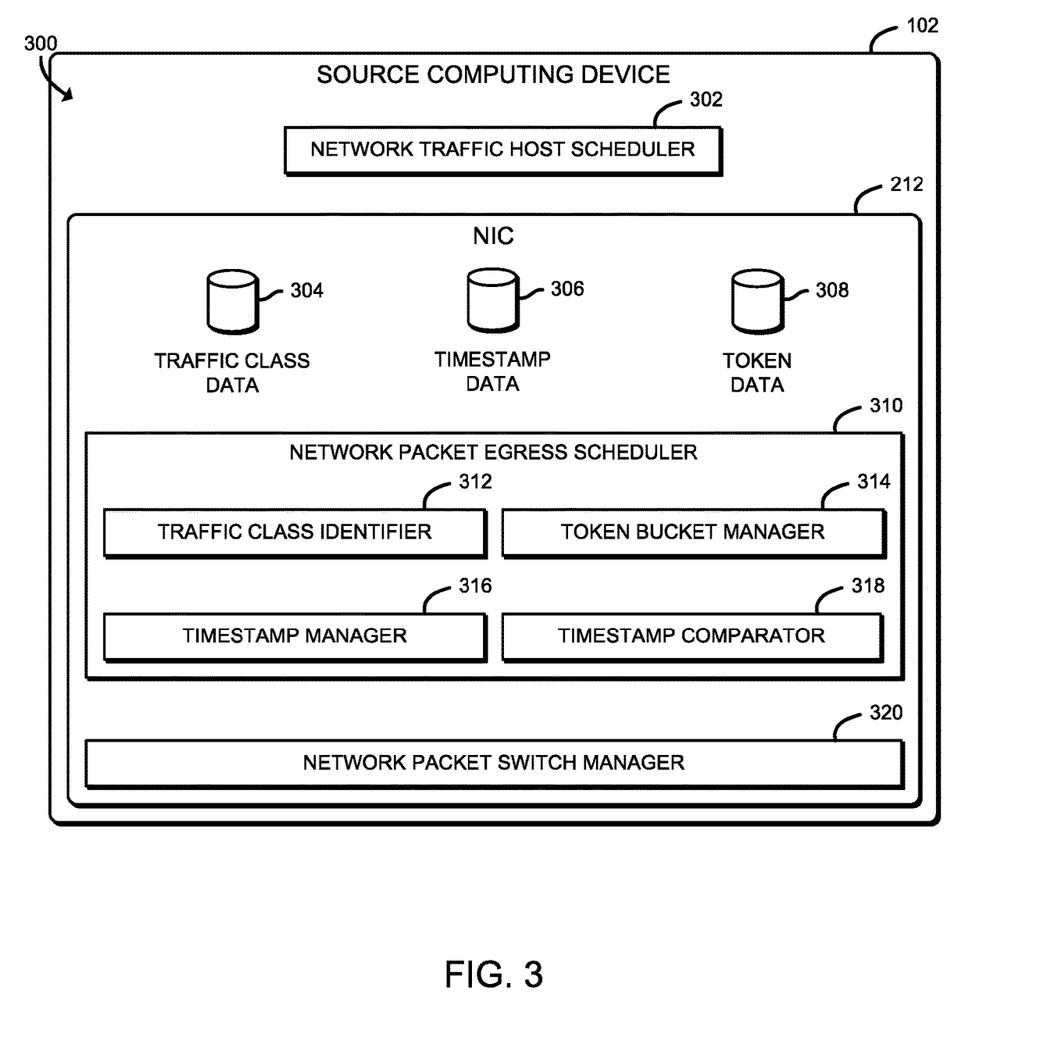
FIG. 3 is a simplified block diagram of at least one embodiment of an environment of the source computing device of the system of FIG. 1.

Referring now to FIG. 3, in use, the source computing device 102 establishes an environment 300 during operation. The illustrative environment 300 includes a network traffic host scheduler 302 and the NIC 212 of FIG. 2 which includes a network packet egress scheduler 310 and a network packet switch manager 320. The various components of the environment 300 may be embodied as hardware, firmware, software, or a combination thereof. As such, in some embodiments, one or more of the components of the environment 300 may be embodied as circuitry or collection of electrical devices (e.g., network traffic host scheduling circuitry 302, network packet egress scheduling circuitry 310, network packet switch circuitry 320, etc.).

It should be appreciated that, in such embodiments, one or more of the network traffic host scheduling circuitry 302, the network packet egress scheduling circuitry 310, and the network packet switch management circuitry 320 may form a portion of one or more of the compute engine 200, the I/O subsystem 206, the communication circuitry 210 (e.g., the NIC 212 of the communication circuitry 210, as illustratively shown), and/or other components of the source computing device 102. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the compute engine 300 or other components of the source computing device 102. It should be appreciated that the source computing device 102 may include other components, sub-components, modules, sub-modules, logic, sub-logic, and/or devices commonly found in a computing device, which are not illustrated in FIG. 3 for clarity of the description.

In the illustrative environment 300, the source computing device 102 additionally includes traffic class data 304, timestamp data 306, and token data 308, each of which may be accessed by the various components and/or sub-components of the source computing device 102. Additionally, it should be appreciated that in some embodiments at least a portion of the data stored in, or otherwise represented by, the traffic class data 304, the timestamp data 306, and the token data 308 may be stored in additional or alternative storage locations (e.g., host memory of the source computing device 102). As such, although the various data utilized by the source computing device 102 is described herein as particular discrete data, such data may be combined, aggregated, and/or otherwise form portions of a single or multiple data sets, including duplicative copies, in other embodiments.

The network packet egress scheduler 310, which may be embodied as hardware, firmware, software, virtualized hardware, emulated architecture, and/or a combination thereof as discussed above, is configured to manage the scheduling of network packets for transmission from the source computing device 102 (e.g., via the switch 320). To do so, the illustrative network packet egress scheduler 310 includes a traffic class identifier 312, a token bucket manager 314, a timestamp manager 316, and a timestamp comparator 318.

The traffic class identifier 312 is configured to identify a traffic class associated with the network packets which are to be scheduled for transmission. To do so, the traffic class identifier 312 is configured to parse at least a portion of a header and/or the payload of the network packet to determine an identifying characteristic usable to identify which resources (e.g., buffers, queues, compute, bandwidth, etc.) of the source computing device 102 can be allocated, such as may be required to provide a predefined level of service to a particular traffic class. The identifying characteristic may be any type of data that is usable to identify a flow, workload, data type, etc., of the network packet, such as a MAC address, a source interne protocol (IP) address, a destination IP address, a source port number, a destination port number, a protocol, etc.). Additionally, the traffic class may be used to determine which target computing device 106 the network packet is to be transmitted (e.g., the appropriate egress port, tunnel, destination media access control (MAC) address, etc.). It should be appreciated that, in some embodiments, the classification information and/or data usable to classify the network packets may be stored in the traffic class data 304.

The token bucket manager 314 is configured to manage the addition and removal of tokens (i.e., representations of a unit of bytes or a single network packet of a predetermined size) to/from a token bucket, typically having a fixed capacity. For example, the token bucket manager 314 is configured to add tokens upon each instance of an elapsed period of time and remove one or more tokens (i.e., depending on whether a token represents a network packet itself or a size/number of bytes thereof), if available, when a network packet is received and transmitted from the source computing device 102 (e.g., sent to the network computing device 106 via the network 104).

The token bucket manager 314 is additionally configured to monitor the amount of tokens (i.e., a present level of the tokens relative to a maximum level of tokens), such that the amount of tokens is usable at any given time to determine, at least in part, whether to transmit, enqueue, or drop the network packet. In other words, the network packet egress scheduler 310 can use the information (e.g., the amount of tokens) monitored by the token bucket manager 314 in a scheduling algorithm to determine the timing of transmissions, such that the transmission timing will comply with the limits set for managing bandwidth and burstiness (e.g., jitter tolerance). The token bucket(s) and/or the amount of tokens for the token bucket(s) may be stored in the token data 308, in some embodiments.

The timestamp manager 316 is configured to capture, store, and update the applicable timestamps used by the network packet egress scheduler 310. For example, the timestamp manager 316 is configured to capture, store, and update a timestamp of a switch of the NIC 212 (e.g., as managed by the network packet switch manager 320), a host scheduler of the source computing device 102, and any other applicable timestamps which are to be captured, stored, and updated. In some embodiments, the timestamp information may be stored in the timestamp data 306.

The timestamp comparator 318 is configured to compare any two given timestamps and return a result of the comparison. For example, the timestamp comparator 318 is configured to determine a time delta (i.e., a switch time delta) by comparing a most recently captured/stored switch time and a presently captured switch time. In another example, the timestamp comparator 318 is configured to determine a time delta (i.e., a host scheduler time delta) by comparing a host scheduler timestamp captured for a network packet and a most recently stored host scheduler timestamp (i.e., from a most recently transmitted network packet from the same traffic class queue as the network packet corresponding to the host scheduler timestamp being compared).

The network packet switch manager 320, which may be embodied as hardware, firmware, software, virtualized hardware, emulated architecture, and/or a combination thereof as discussed above, is configured to receive inbound and route/transmit outbound network traffic. The network packet switch manager 320 is configured to facilitate inbound/outbound network communications (e.g., network traffic, network packets, network flows, etc.) to and from the target computing device 106. For example, the network packet switch manager 320 is configured to manage (e.g., create, modify, delete, etc.) connections to physical and virtual network ports (i.e., virtual network interfaces) of the target computing device 106 (e.g., via the communication circuitry 210), as well as the ingress/egress buffers/queues associated therewith.

Figure 4A:
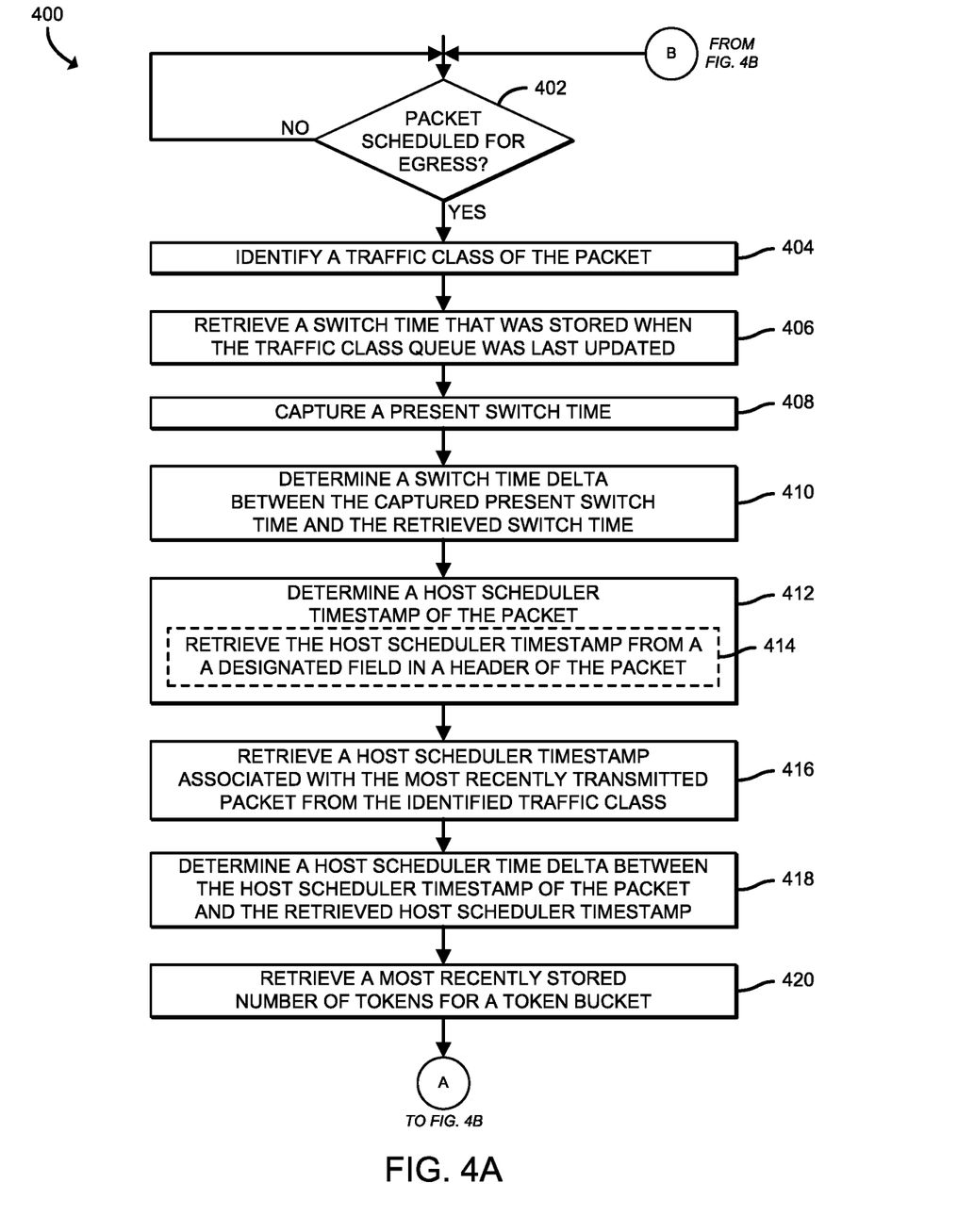
FIGS. 4A and 4B are a simplified block diagram of at least one embodiment of a method for controlling jitter at network packet egress that may be executed by the source computing device of FIGS. 1-3.
Figure 4B:
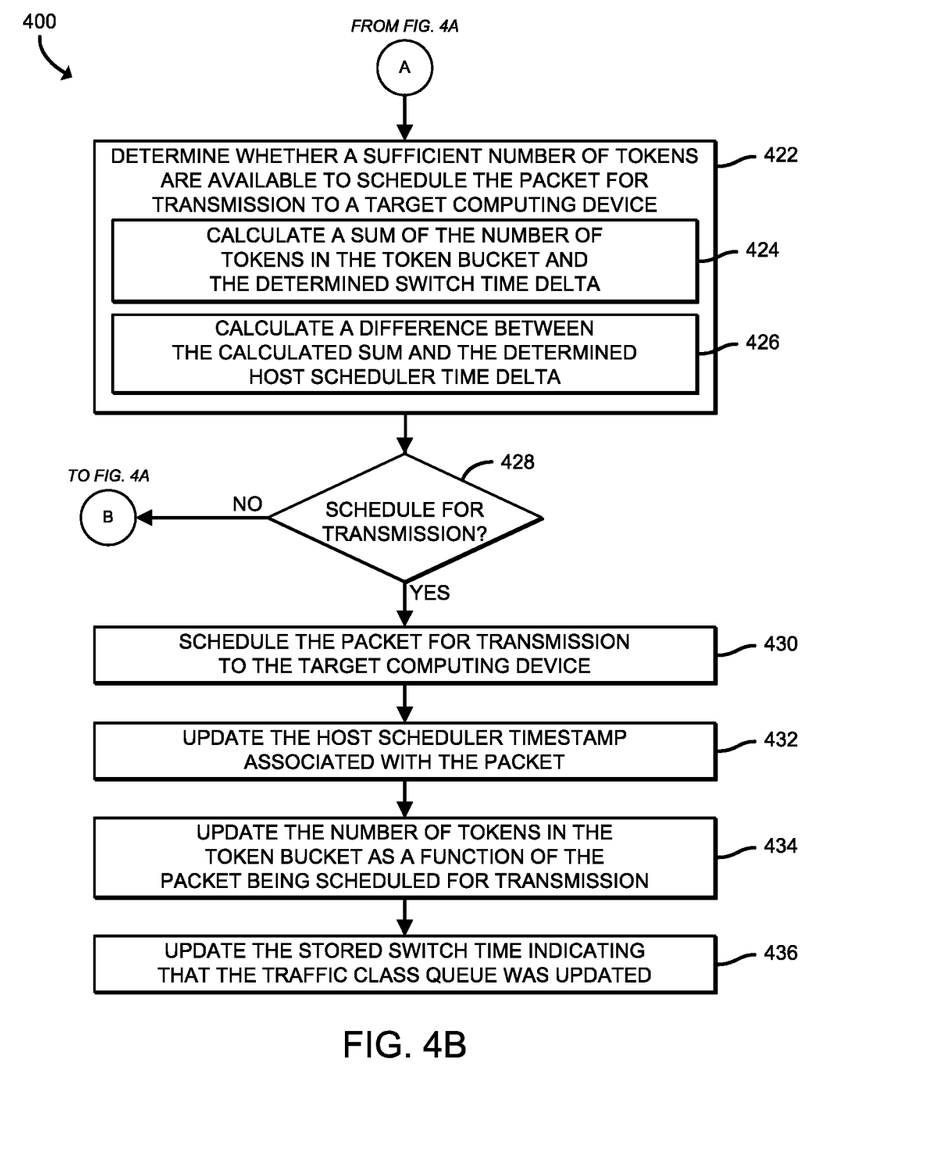

Referring now to FIGS. 4A and 4B, a method 400 for controlling jitter at network packet egress is shown which may be executed by a computing device (e.g., the source computing device 102 of FIGS. 1-3), or more particularly by a NIC of the computing device (e.g., the illustrative NIC 212 of FIGS. 2 and 3). The method 400 begins with block 402, in which the NIC 212 determines whether a network packet has been scheduled for egress (i.e., transmission to a target computing device, such as the network computing device 106 of FIG. 1). If so, the method 400 advances to block 404, in which the NIC 212 identifies a traffic class of the packet. Accordingly, it should be appreciated that the network packet may include or has otherwise been associated with a traffic descriptor usable to categorize or define the network packet.

In block 406, the NIC 212 retrieves a switch time (e.g., a timestamp) which is usable to identify when the traffic class queue was last updated. In block 408, the NIC captures a present switch time. In block 410, the NIC 212 determines a switch time delta between the switch time retrieved in block 406 (i.e., indicating when the traffic class queue was last updated) and the present switch time captured in block 408. It should be appreciated that the switch time delta represents the number of tokens added to the token bucket during the period of time between the switch time retrieved in block 406 (i.e., indicating when the traffic class queue was last updated) and the present switch time captured in block 408.

In block 412, the NIC 212 determines a host scheduler timestamp of the network packet. To do so, for example in block 414, the NIC 212 may retrieve the host scheduler timestamp from a designated field in a header of the packet. In block 416, the NIC 212 retrieves a previously stored host scheduler timestamp associated with the most recently transmitted network packet from the traffic class identified in block 404. In other words, the NIC 212 retrieves the previously stored host scheduler timestamp associated with the last transmitted network packet from the same traffic class queue as the network packet to be scheduled for transmission. In block 418, the NIC 212 determines a host scheduler time delta between the host scheduler timestamp of the network packet determined in block 412 and the host scheduler timestamp retrieved in block 416. It should be appreciated that the host scheduler time delta represents the number of tokens which are to be deducted upon scheduling the transmission of the network packet.

In block 420, the NIC 212 retrieves a most recently stored number of tokens in a token bucket (i.e., the amount of tokens which were in the token bucket at the time at which the amount of tokens were last captured and stored). As described previously, one or more tokens (i.e., depending on whether a token represents a network packet itself or a size/number of bytes thereof) are added to the token bucket upon each instance of an elapsed period of time and removed, if available, when a network packet is received and transmitted from the source computing device 102. In block 422, shown in FIG. 4B, the NIC 212 determines whether there are a sufficient number of tokens available in the token bucket to schedule the network packet for transmission to a target computing device. To do so, the NIC 212 determines whether the network packet is to be scheduled for transmission as a function of the number of tokens in the token bucket, the switch time delta determined in block 410, and the host scheduler time delta determined in block 418.

For example, in block 424, the NIC 212 calculates a sum of the most recently stored number of tokens in the token bucket retrieved in block 420 and the switch time delta determined in block 410. Additionally, in block 426, the NIC 212 calculates a difference between the sum calculated in block 424 and the host scheduler time delta determined in block 418. In other words, the NIC 212 adds the number of tokens in the token bucket retrieved in block 420 with the number of generated tokens represented by the switch time delta determined in block 410 and subtracts the number of tokens to be deducted as a function of transmitting the network packet, which are represented by the host scheduler time delta determined in block 418.

In block 428, the NIC 212 determines whether to schedule the network packet for transmission based on a result of the determination performed in block 422. To do so, the NIC 212 determines whether the difference between the switch time delta and the host scheduler time delta, plus the number of tokens in the token bucket at the most recently captured time is greater than or equal to zero (i.e., whether the previous token count, plus the switch time delta, minus the host scheduler time delta, is greater than or equal to zero). If the NIC 212 determines not to schedule the network packet for transmission, the method 400 returns to block 402 to determine whether another network packet has been scheduled for transmission. It should be appreciated that the network packet may be discarded (i.e., dropped) upon the NIC 212 having determined not to schedule the network packet for transmission.

Otherwise, If the NIC 212 determines not to schedule the network packet for transmission, the method 400 advances to block 430, in which the NIC 212 schedules the network packet for transmission to the target computing device. In block 432, the NIC 212 saves the host scheduler timestamp associated with the network packet as the host scheduler timestamp associated with the most recently transmitted network packet. In block 434, the NIC 212 updates the number of tokens in the token bucket as a function of the packet being scheduled for transmission. For example, the NIC 212 may remove number of tokens represented by the host scheduler time delta determined in block 418 from the token bucket. In block 436, the NIC 212 saves the present switch time as the switch time usable to identify when the traffic class queue was last updated.

Figure 5:
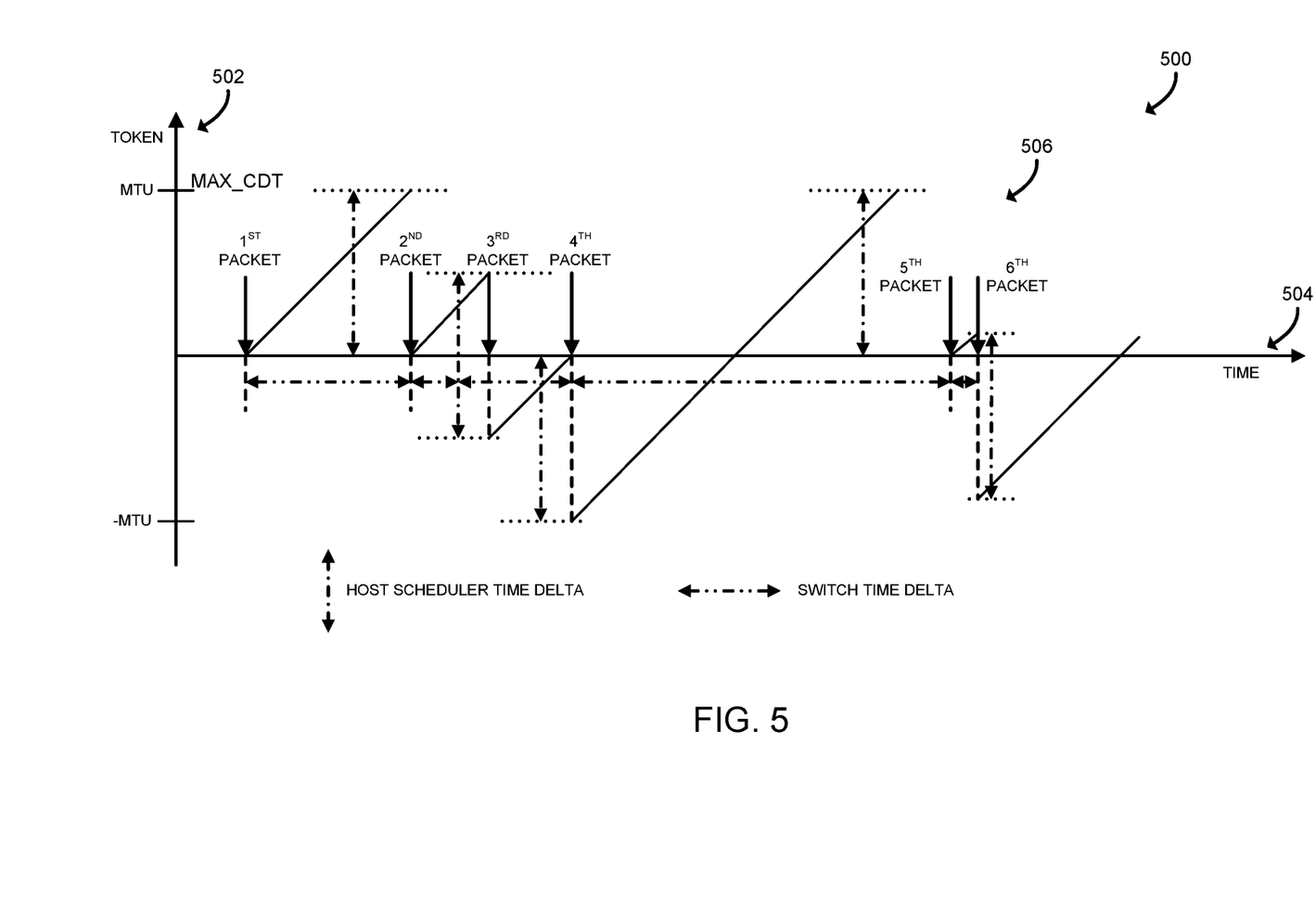
FIG. 5 is a simplified line chart diagram of at least one illustrative embodiment of a series of network packets arriving over a period of time at a switch of the source computing device of FIGS. 1-3 for egress from the source computing device, and the calculations for controlling jitter at network packet egress being performed thereon.

Referring now to FIG. 5, a line chart 500 displays a series of network packets 506 arriving over a period of time at the NIC 212 (e.g., a switch of the NIC 212) of the source computing device 102. The line chart 500 includes a y-axis 502 indicating a token count and an x-axis 502 indicating a relative point in time. Additionally, the line chart 500 displays the arrival of each of the series of network packets as a function of time (i.e., the x-axis 502). It should be appreciated that each of the series of network packets 506 has been received from the host scheduler with a time delta equal to the maximum transmission unit (MTU) (i.e., the size of the largest network layer protocol data unit that can be communicated in a single network transaction).

The line chart 500 additionally displays the host scheduler time deltas (i.e., relative y-axis 502) and the switch time deltas (i.e., relative to the x-axis 504) as can be determined as a function of the time of receipt of each network packet 506. As illustratively shown, the number of tokens is saturated at 1×MTU equivalent (i.e., MAX_CDT). It should be appreciated that, in a worst-case scenario, the NIC 212 can schedule 2×MTUs nearly back-to-back (i.e., 2×MTU max burst size), as illustrated by the time delta between the scheduling of the $5^{th}$ and $6^{th}$ network packets 506.

EXAMPLES

Illustrative examples of the technologies disclosed herein are provided below. An embodiment of the technologies may include any one or more, and any combination of, the examples described below.

Example 1 includes a source computing device for controlling jitter at network packet egress, the source computing device comprising a compute engine; and a network interface controller (NIC) to receive a network packet that is to be scheduled for transmission to another computing device; determine a switch time delta as a difference between a present switch time and a previously captured switch time, wherein the previously captured switch time indicates a time at which a traffic class queue from which the received network packet has been received was last updated; determine a host scheduler time delta as a difference between a host scheduler timestamp associated with the received network packet and a previously captured host scheduler timestamp, wherein the previously captured switch time indicates a time at which a most recently transmitted network packet was transmitted; determine an amount of previously captured tokens present in a token bucket, wherein each token is indicative of a predefined amount of elapsed time; determine whether there are a sufficient number of tokens available in the token bucket to transmit the received packet as a function of (i) the switch time delta, (ii) the host scheduler time delta, and (iii) the amount of previously captured tokens present in the token bucket; and schedule, in response to a determination that there are sufficient tokens in the token bucket, the received network packet for transmission to the other computing device.

Example 2 includes the subject matter of Example 1, and wherein the switch time delta indicates an elapsed period of time usable to determine a number of tokens that have been added to the token button between the previously captured switch time and the present switch time.

Example 3 includes the subject matter of any of Examples 1 and 2, and wherein to determine whether there are the sufficient number of tokens available in the token bucket comprises to (i) calculate a difference between the switch time delta and the host scheduler time delta, (ii) calculate a sum of the calculated difference and the previously captured amount of tokens, (iii) and determine that there are the sufficient number of tokens available in the token bucket based on whether the sum is greater than or equal to zero.

Example 4 includes the subject matter of any of Examples 1-3, and wherein the NIC is further to identify a traffic class of the received network packet, and wherein the most recently transmitted network packet comprises the most recently transmitted network packet transmitted from the same traffic class as the received network packet.

Example 5 includes the subject matter of any of Examples 1-4, and wherein the NIC is further to update, subsequent to having scheduled the received network packet for transmission, the previously captured host scheduler timestamp to equal the host scheduler timestamp of the received network packet.

Example 6 includes the subject matter of any of Examples 1-5, and wherein the NIC is further to update, subsequent to having scheduled the received network packet for transmission, the number of tokens available in the token bucket as a function of the host scheduler time delta.

Example 7 includes the subject matter of any of Examples 1-6, and wherein the NIC is further to update, subsequent to having scheduled the received network packet for transmission, the previously captured switch time to equal the present switch time.

Example 8 includes the subject matter of any of Examples 1-7, and wherein the NIC is further to retrieve the host scheduler timestamp from a designated field in a header of the received network packet.

Example 9 includes one or more machine-readable storage media comprising a plurality of instructions stored thereon that, in response to being executed, cause a source computing device to receive, by a network interface controller (NIC) of the source computing device, a network packet that is to be scheduled for transmission to another computing device; determine a switch time delta as a difference between a present switch time and a previously captured switch time, wherein the previously captured switch time indicates a time at which a traffic class queue from which the received network packet has been received was last updated; determine a host scheduler time delta as a difference between a host scheduler timestamp associated with the received network packet and a previously captured host scheduler timestamp, wherein the previously captured switch time indicates a time at which a most recently transmitted network packet was transmitted; determine an amount of previously captured tokens present in a token bucket, wherein each token is indicative of a predefined amount of elapsed time; determine whether there are a sufficient number of tokens available in the token bucket to transmit the received packet as a function of (i) the switch time delta, (ii) the host scheduler time delta, and (iii) the amount of previously captured tokens present in the token bucket; and schedule, in response to a determination that there are sufficient tokens in the token bucket, the received network packet for transmission to the other computing device.

Example 10 includes the subject matter of Example 9, and wherein the switch time delta indicates an elapsed period of time usable to determine a number of tokens that have been added to the token button between the previously captured switch time and the present switch time.

Example 11 includes the subject matter of any of Examples 9 and 10, and wherein to determine whether there are the sufficient number of tokens available in the token bucket comprises to (i) calculate a difference between the switch time delta and the host scheduler time delta, (ii) calculate a sum of the calculated difference and the previously captured amount of tokens, (iii) and determine that there are the sufficient number of tokens available in the token bucket based on whether the sum is greater than or equal to zero.

Example 12 includes the subject matter of any of Examples 9-11, and wherein the plurality of instructions further cause the source computing device to identify a traffic class of the received network packet, and wherein the most recently transmitted network packet comprises the most recently transmitted network packet transmitted from the same traffic class as the received network packet.

Example 13 includes the subject matter of any of Examples 9-12, and wherein the plurality of instructions further cause the source computing device to update, subsequent to having scheduled the received network packet for transmission, the previously captured host scheduler timestamp to equal the host scheduler timestamp of the received network packet.

Example 14 includes the subject matter of any of Examples 9-13, and wherein the plurality of instructions further cause the source computing device to update, subsequent to having scheduled the received network packet for transmission, the number of tokens available in the token bucket as a function of the host scheduler time delta.

Example 15 includes the subject matter of any of Examples 9-14, and wherein the plurality of instructions further cause the source computing device to update, subsequent to having scheduled the received network packet for transmission, the previously captured switch time to equal the present switch time.

Example 16 includes the subject matter of any of Examples 9-15, and wherein the plurality of instructions further cause the source computing device to retrieve the host scheduler timestamp from a designated field in a header of the received network packet.

Example 17 includes a source computing device for controlling jitter at network packet egress, the source computing device comprising circuitry for receiving a network packet that is to be scheduled for transmission to another computing device; means for determining a switch time delta as a difference between a present switch time and a previously captured switch time, wherein the previously captured switch time indicates a time at which a traffic class queue from which the received network packet has been received was last updated; means for determining a host scheduler time delta as a difference between a host scheduler timestamp associated with the received network packet and a previously captured host scheduler timestamp, wherein the previously captured switch time indicates a time at which a most recently transmitted network packet was transmitted; means for determining an amount of previously captured tokens present in a token bucket, wherein each token is indicative of a predefined amount of elapsed time; means for determining whether there are a sufficient number of tokens available in the token bucket to transmit the received packet as a function of (i) the switch time delta, (ii) the host scheduler time delta, and (iii) the amount of previously captured tokens present in the token bucket; and means for scheduling, in response to a determination that there are sufficient tokens in the token bucket, the received network packet for transmission to the other computing device.

Example 18 includes the subject matter of Example 17, and wherein the switch time delta indicates an elapsed period of time usable to determine a number of tokens that have been added to the token button between the previously captured switch time and the present switch time.

Example 19 includes the subject matter of any of Examples 17 and 18, and wherein the means for determining whether there are the sufficient number of tokens available in the token bucket comprises means for (i) calculating a difference between the switch time delta and the host scheduler time delta, (ii) calculating a sum of the calculated difference and the previously captured amount of tokens, (iii) and determining that there are the sufficient number of tokens available in the token bucket based on whether the sum is greater than or equal to zero.

Example 20 includes the subject matter of any of Examples 17-19, and further including means for identifying a traffic class of the received network packet, and wherein the most recently transmitted network packet comprises the most recently transmitted network packet transmitted from the same traffic class as the received network packet.

Example 21 includes the subject matter of any of Examples 17-20, and further including means for updating, by the NIC and subsequent to having scheduled the received network packet for transmission, the previously captured host scheduler timestamp to equal the host scheduler timestamp of the received network packet.

Example 22 includes the subject matter of any of Examples 17-21, and further including means for updating, subsequent to having scheduled the received network packet for transmission, the number of tokens available in the token bucket as a function of the host scheduler time delta.

Example 23 includes the subject matter of any of Examples 17-22, and further including means for updating, subsequent to having scheduled the received network packet for transmission, the previously captured switch time to equal the present switch time.

Example 24 includes the subject matter of any of Examples 17-23, and further including circuitry for retrieving, by the NIC, the host scheduler timestamp from a designated field in a header of the received network packet.

The invention claimed is:

1. A source computing device for controlling jitter at network packet egress, the source computing device comprising:
   a compute engine; and
   a network interface controller (NIC) to:
   receive a network packet that is to be scheduled for transmission to another computing device;
   determine a switch time delta as a difference between a present switch time and a previously captured switch time, wherein the previously captured switch time indicates a time at which a traffic class queue from which the received network packet has been received was last updated;
   determine a host scheduler time delta as a difference between a host scheduler timestamp associated with the received network packet and a previously captured host scheduler timestamp, wherein the previously captured switch time indicates a time at which a most recently transmitted network packet was transmitted;
   determine an amount of previously captured tokens present in a token bucket, wherein each token is indicative of a predefined amount of elapsed time;
   determine whether there are a sufficient number of tokens available in the token bucket to transmit the received network packet as a function of (i) the switch time delta, (ii) the host scheduler time delta, and (iii) the amount of previously captured tokens present in the token bucket; and
   schedule, in response to a determination that there are sufficient tokens in the token bucket, the received network packet for transmission to the another computing device.

2. The source computing device of claim 1, wherein the switch time delta indicates an elapsed period of time usable to determine a number of tokens that have been added to the token bucket between the previously captured switch time and the present switch time.

3. The source computing device of claim 2, wherein to determine whether there are the sufficient number of tokens available in the token bucket comprises to (i) calculate a difference between the switch time delta and the host scheduler time delta, (ii) calculate a sum of the calculated difference and the previously captured amount of tokens, (iii) and determine that there are the sufficient number of tokens available in the token bucket based on whether the sum is greater than or equal to zero.

4. The source computing device of claim 1, wherein the NIC is further to identify a traffic class of the received network packet, and wherein the most recently transmitted network packet comprises the most recently transmitted network packet transmitted from the same traffic class as the received network packet.

5. The source computing device of claim 1, wherein the NIC is further to update, subsequent to having scheduled the received network packet for transmission, the previously captured host scheduler timestamp to equal the host scheduler timestamp of the received network packet.

6. The source computing device of claim 1, wherein the NIC is further to update, subsequent to having scheduled the received network packet for transmission, the number of tokens available in the token bucket as a function of the host scheduler time delta.

7. The source computing device of claim 1, wherein the NIC is further to update, subsequent to having scheduled the received network packet for transmission, the previously captured switch time to equal the present switch time.

8. The source computing device of claim 1, wherein the NIC is further to retrieve the host scheduler timestamp from a designated field in a header of the received network packet.

9. One or more non-transitory machine-readable storage media comprising a plurality of instructions stored thereon that, in response to being executed, cause a source computing device to:
receive, by a network interface controller (NIC) of the source computing device, a network packet that is to be scheduled for transmission to another computing device;
determine a switch time delta as a difference between a present switch time and a previously captured switch time, wherein the previously captured switch time indicates a time at which a traffic class queue from which the received network packet has been received was last updated;
determine a host scheduler time delta as a difference between a host scheduler timestamp associated with the received network packet and a previously captured host scheduler timestamp, wherein the previously captured switch time indicates a time at which a most recently transmitted network packet was transmitted;
determine an amount of previously captured tokens present in a token bucket, wherein each token is indicative of a predefined amount of elapsed time;
determine whether there are a sufficient number of tokens available in the token bucket to transmit the received network packet as a function of (i) the switch time delta, (ii) the host scheduler time delta, and (iii) the amount of previously captured tokens present in the token bucket; and
schedule, in response to a determination that there are sufficient tokens in the token bucket, the received network packet for transmission to the another computing device.

10. The one or more non-transitory machine-readable storage media of claim 9, wherein the switch time delta indicates an elapsed period of time usable to determine a number of tokens that have been added to the token bucket between the previously captured switch time and the present switch time.

11. The one or more non-transitory machine-readable storage media of claim 10, wherein to determine whether there are the sufficient number of tokens available in the token bucket comprises to (i) calculate a difference between the switch time delta and the host scheduler time delta, (ii) calculate a sum of the calculated difference and the previously captured amount of tokens, (iii) and determine that there are the sufficient number of tokens available in the token bucket based on whether the sum is greater than or equal to zero.

12. The one or more non-transitory machine-readable storage media of claim 9, wherein the plurality of instructions further cause the source computing device to identify a traffic class of the received network packet, and wherein the most recently transmitted network packet comprises the most recently transmitted network packet transmitted from the same traffic class as the received network packet.

13. The one or more non-transitory machine-readable storage media of claim 9, wherein the plurality of instructions further cause the source computing device to update, subsequent to having scheduled the received network packet for transmission, the previously captured host scheduler timestamp to equal the host scheduler timestamp of the received network packet.

14. The one or more non-transitory machine-readable storage media of claim 9, wherein the plurality of instructions further cause the source computing device to update, subsequent to having scheduled the received network packet for transmission, the number of tokens available in the token bucket as a function of the host scheduler time delta.

15. The one or more non-transitory machine-readable storage media of claim 9, wherein the plurality of instructions further cause the source computing device to update, subsequent to having scheduled the received network packet for transmission, the previously captured switch time to equal the present switch time.

16. The one or more non-transitory machine-readable storage media of claim 9, wherein the plurality of instructions further cause the source computing device to retrieve the host scheduler timestamp from a designated field in a header of the received network packet.

* * * * *